United States Patent
Wald

(10) Patent No.: US 10,282,890 B2
(45) Date of Patent: May 7, 2019

(54) METHOD AND APPARATUS FOR THE PROPER ORDERING AND ENUMERATION OF MULTIPLE SUCCESSIVE RAY-SURFACE INTERSECTIONS WITHIN A RAY TRACING ARCHITECTURE

(71) Applicant: Intel Corporation, Santa Clara, CA (US)

(72) Inventor: Ingo Wald, Salt Lake City, UT (US)

(73) Assignee: INTEL CORPORATION, Santa Clara, CA (US)

(*) Notice: Subject to any disclaimer, the term of this patent is extended or adjusted under 35 U.S.C. 154(b) by 100 days.

(21) Appl. No.: 15/280,912

(22) Filed: Sep. 29, 2016

(65) Prior Publication Data

US 2018/0089885 A1     Mar. 29, 2018

(51) Int. Cl.
| | |
|---|---|
| *G06T 15/06* | (2011.01) |
| *G06T 1/20* | (2006.01) |
| *G06T 1/60* | (2006.01) |
| *G06F 12/0875* | (2016.01) |

(52) U.S. Cl.
CPC .......... *G06T 15/06* (2013.01); *G06F 12/0875* (2013.01); *G06T 1/20* (2013.01); *G06T 1/60* (2013.01); *G06F 2212/452* (2013.01); *G06T 2210/21* (2013.01)

(58) Field of Classification Search
CPC ............................ G06T 15/06; G06T 2210/21
USPC ....................................................... 345/426
See application file for complete search history.

(56) References Cited

U.S. PATENT DOCUMENTS

| | | | |
|---|---|---|---|
| 6,977,649 B1* | 12/2005 | Baldwin | G06T 15/005 345/419 |
| 2005/0146522 A1 | 7/2005 | Maillot | |
| 2009/0256845 A1* | 10/2009 | Sevastianov | G06T 15/06 345/426 |
| 2009/0322752 A1* | 12/2009 | Peterson | G06T 15/06 345/426 |
| 2010/0053162 A1* | 3/2010 | Dammertz | G06T 15/06 345/426 |
| 2010/0207947 A1 | 8/2010 | Sagalov | |
| 2011/0032257 A1* | 2/2011 | Peterson | G06T 15/005 345/420 |
| 2011/0069067 A1 | 3/2011 | Oezdas et al. | |

(Continued)

OTHER PUBLICATIONS

Eric Tabellion and Arnauld Lamorlette. 2004. An approximate global illumination system for computer generated films. In <em>ACM SIGGRAPH 2004 Papers</em> (SIGGRAPH '04), Joe Marks (Ed.). ACM, New York, NY, USA, 469-476. DOI:https://doi.org/10.1145/1186562.1015748.*

(Continued)

*Primary Examiner* — Kimberly A Williams
(74) *Attorney, Agent, or Firm* — Nicholson De Vos Webster & Elliott LLP

(57) ABSTRACT

An apparatus and method are described for performing a distance test in a ray tracing system. For example, one embodiment of a graphics processing apparatus comprises: a ray tracing traversal/intersection unit to identify two or more ray-surface intersections, each of the ray-surface intersections being assigned a unique hit point identifier (ID); and a distance testing module to disambiguate the order of the ray-surface intersections using the hit point ID if the two or more of the ray-surface intersections share the same distance.

22 Claims, 15 Drawing Sheets

(56) References Cited

U.S. PATENT DOCUMENTS

| | | | |
|---|---|---|---|
| 2011/0267347 A1* | 11/2011 | Purcell | G06T 15/06 345/426 |
| 2012/0133654 A1* | 5/2012 | Redgrave | G06T 15/005 345/419 |
| 2012/0139926 A1* | 6/2012 | Clohset | G06T 15/005 345/502 |
| 2012/0249553 A1 | 10/2012 | Peterson et al. | |
| 2014/0244693 A1* | 8/2014 | Lee | G06T 15/06 707/797 |
| 2014/0306959 A1* | 10/2014 | Ozdas | G06T 15/06 345/424 |
| 2015/0091895 A1 | 4/2015 | Shin et al. | |
| 2015/0317765 A1* | 11/2015 | Haw | G06T 15/503 345/420 |
| 2016/0093112 A1* | 3/2016 | Haw | G06T 11/60 345/419 |

OTHER PUBLICATIONS

International Search Report and Written Opinion for Application No. PCT/US2017/047793, dated Nov. 29, 2017, 16 pages.

* cited by examiner

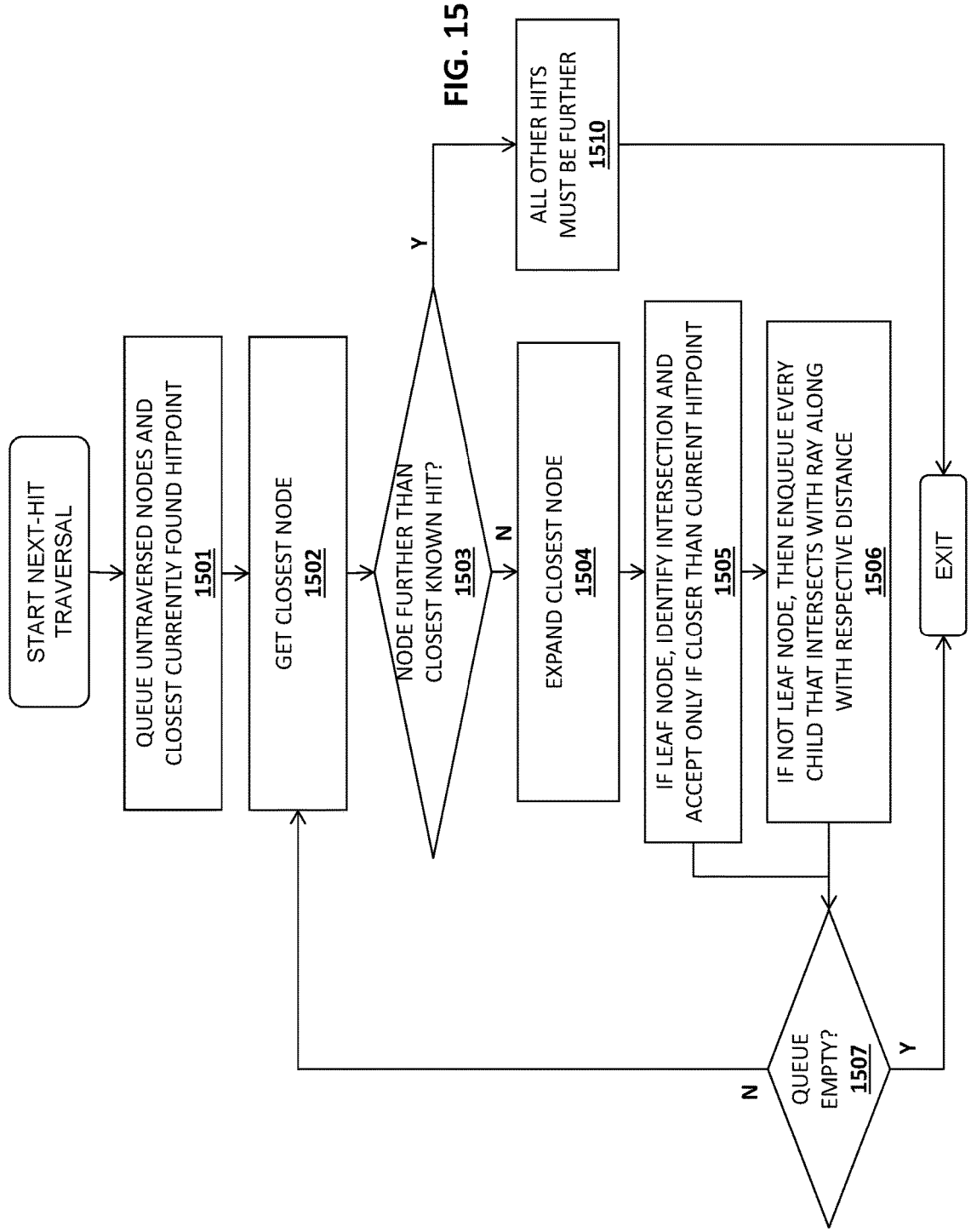

METHOD AND APPARATUS FOR THE PROPER ORDERING AND ENUMERATION OF MULTIPLE SUCCESSIVE RAY-SURFACE INTERSECTIONS WITHIN A RAY TRACING ARCHITECTURE

BACKGROUND

Field of the Invention

This invention relates generally to the field of computer processors. More particularly, the invention relates to an apparatus and method for identifying the proper ordering and enumeration of successive ray-surface intersections in a ray tracing architecture.

Description of the Related Art

Ray tracing is a graphics processing technique for generating an image by traversing the path of each light ray through pixels in an image plane and simulating the effects of its incidence upon different objects. Following traversal calculations, each ray is typically tested for intersection with some subset of the objects in the scene. Once the nearest object has been identified, the incoming light at the point of intersection is estimated, the material properties of the object are determined, and this information is used to calculate the final color of the pixel.

BRIEF DESCRIPTION OF THE DRAWINGS

A better understanding of the present invention can be obtained from the following detailed description in conjunction with the following drawings, in which:

FIG. 15 illustrates one embodiment of a method for finding a next hit in a ray tracing implementation.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
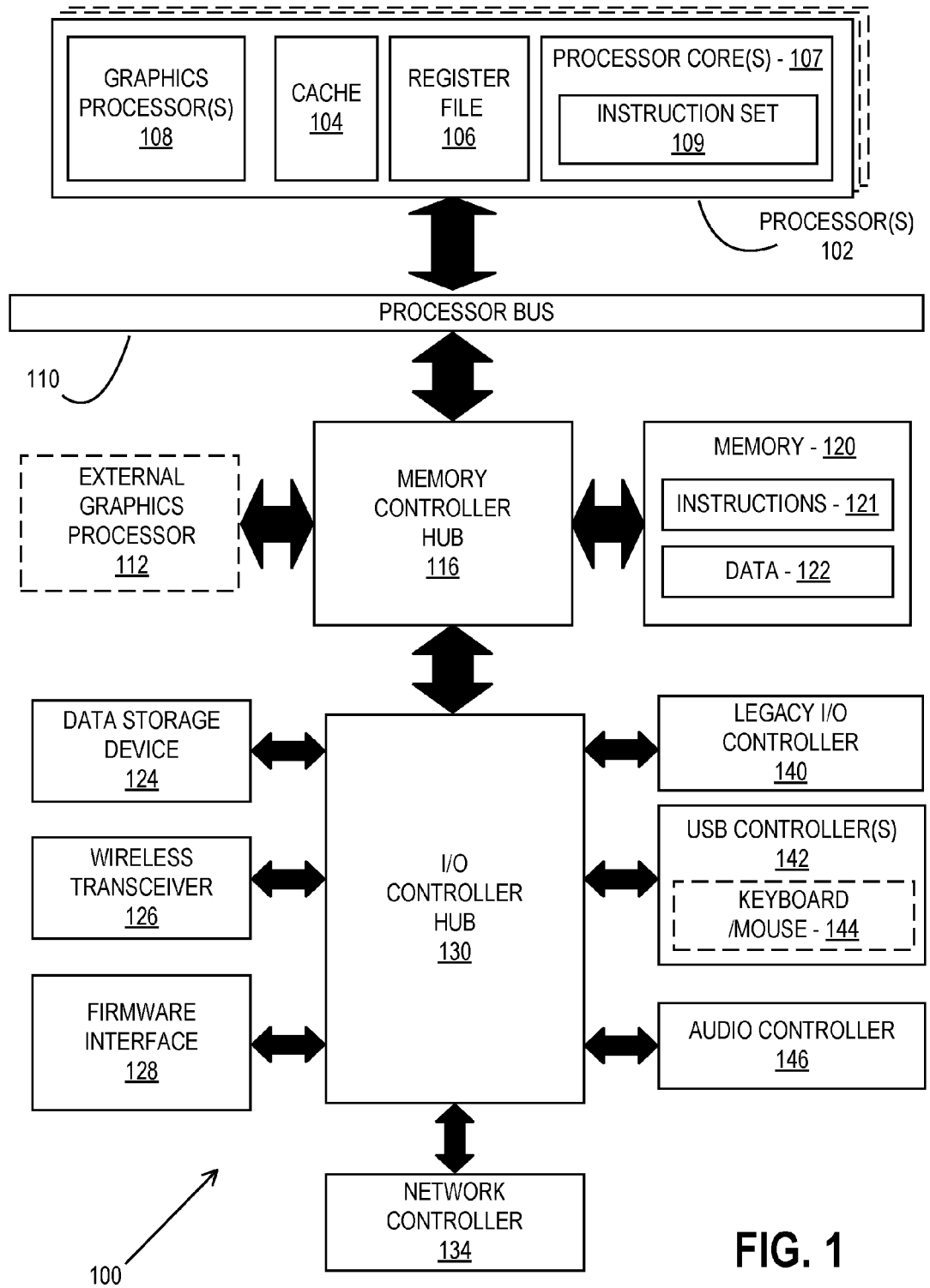
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and 110 controller hub 130 may be integrated into a discreet external graphics processor, such as the external graphics processor 112.

Figure 2:
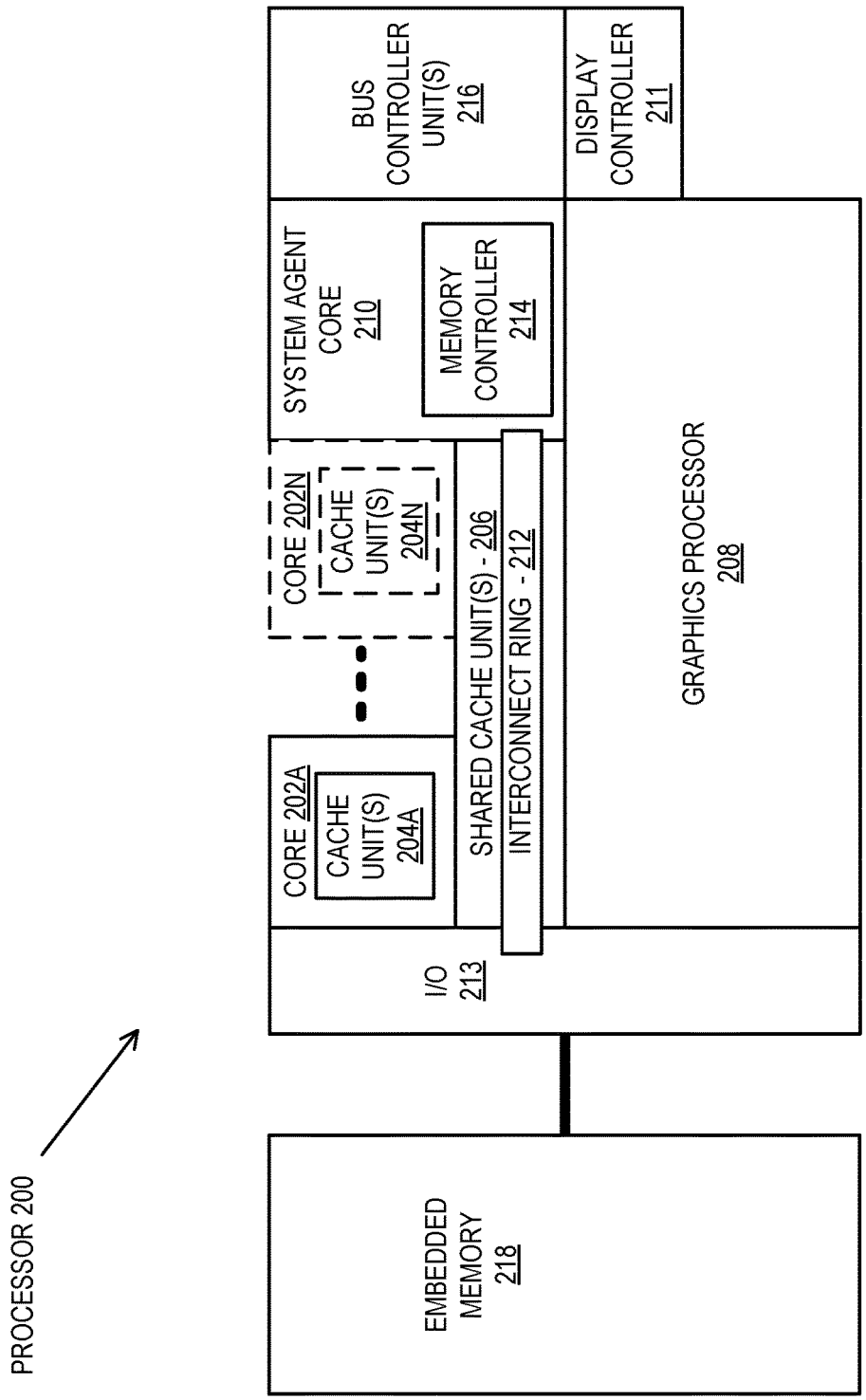
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
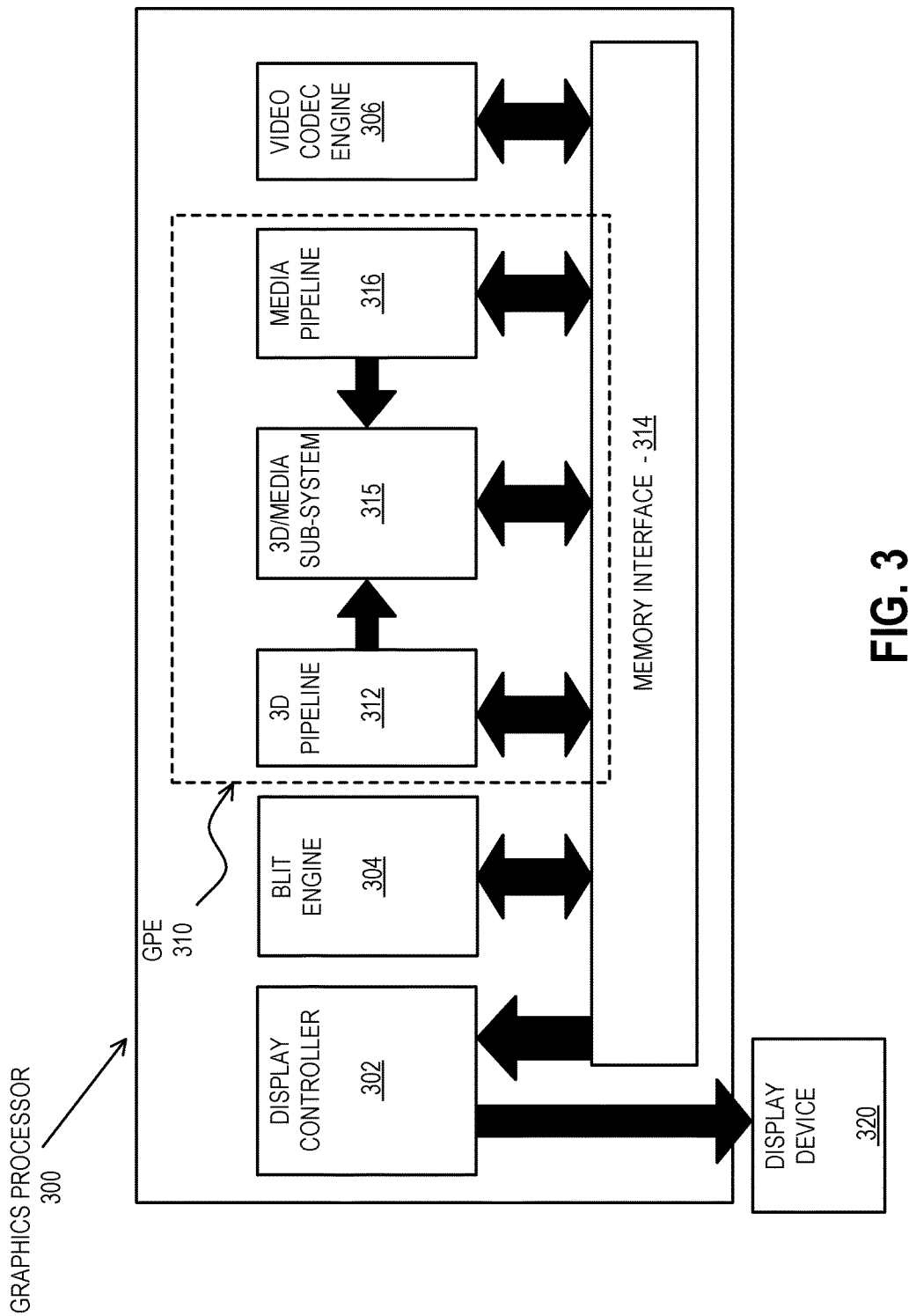
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
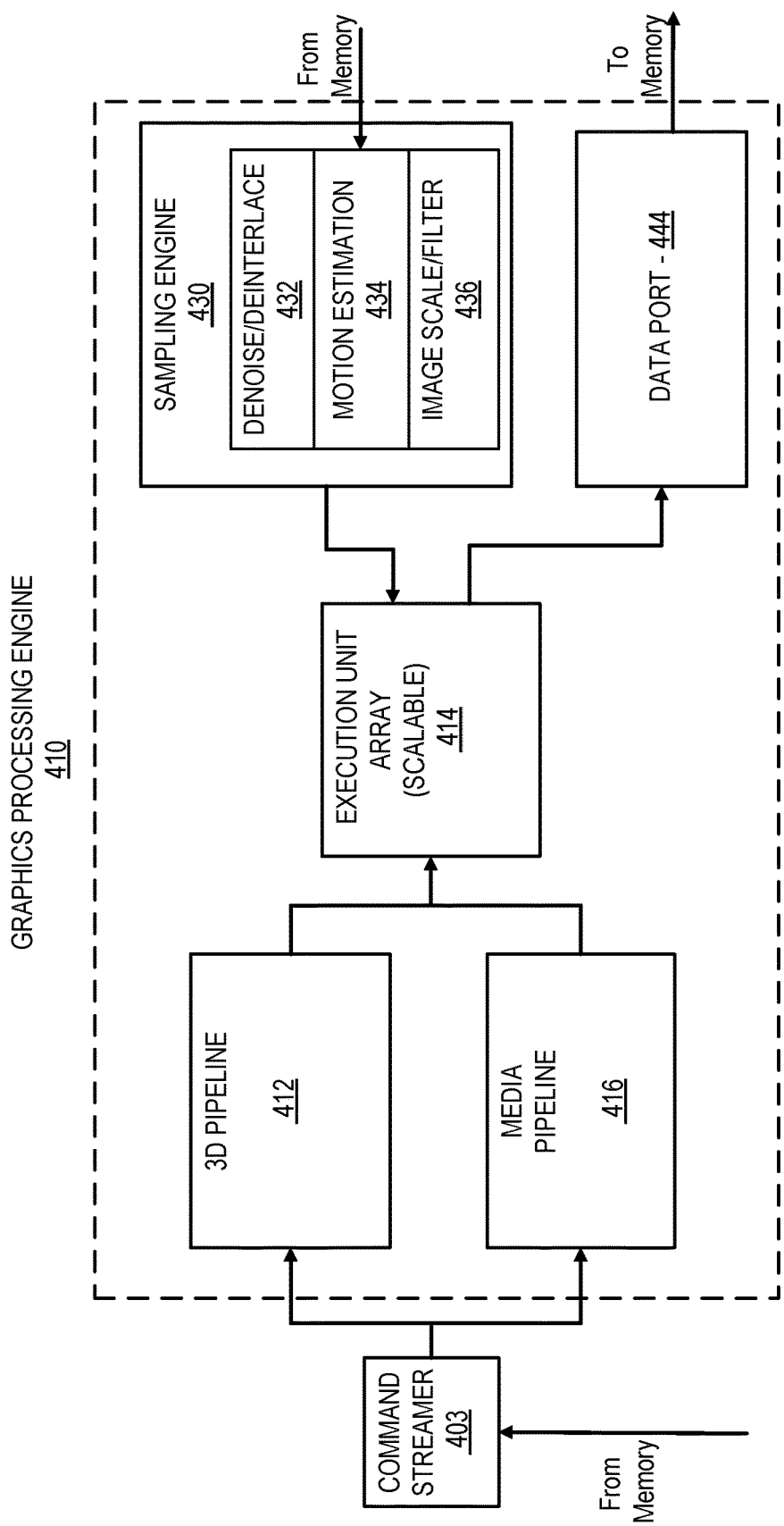
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
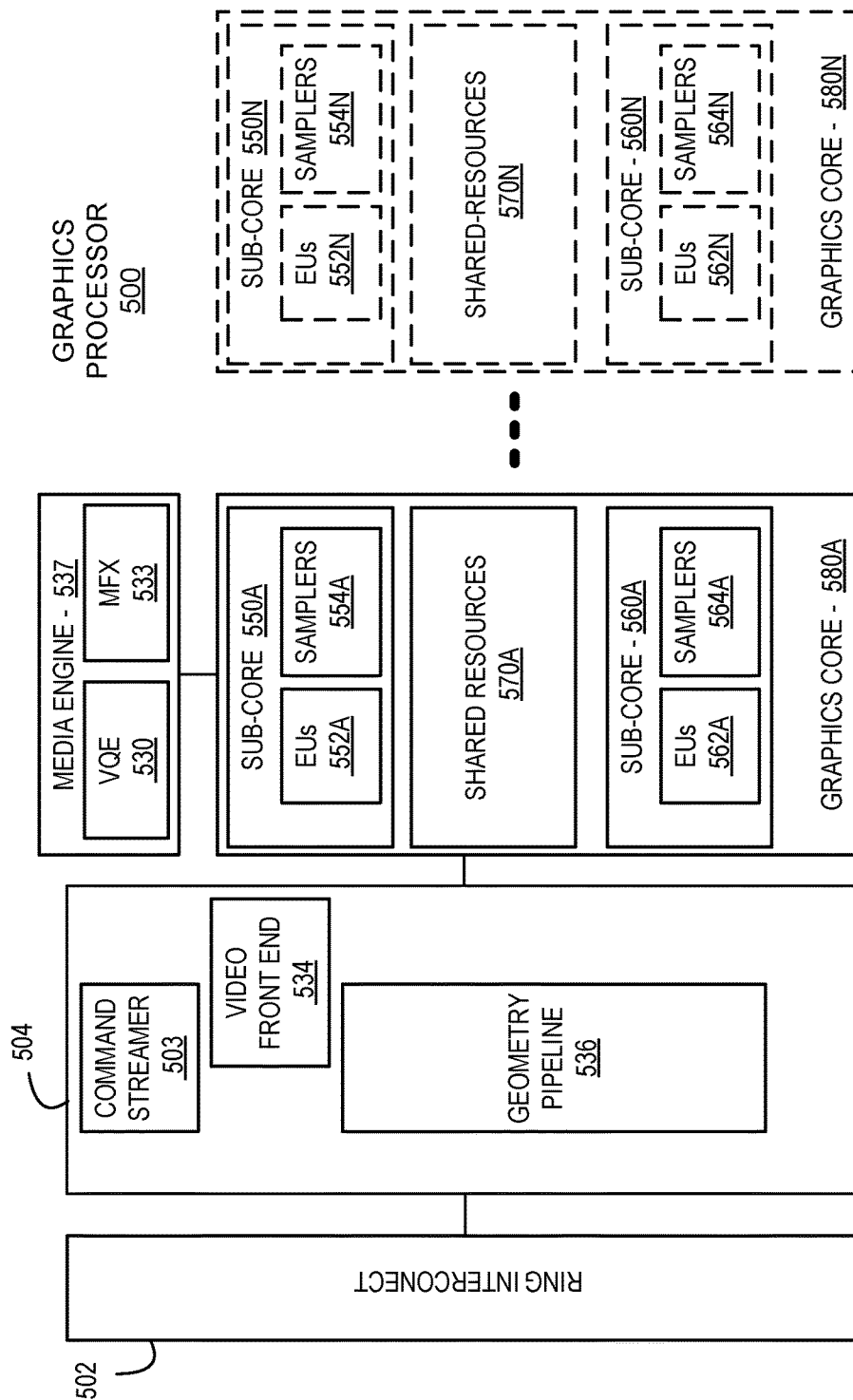
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
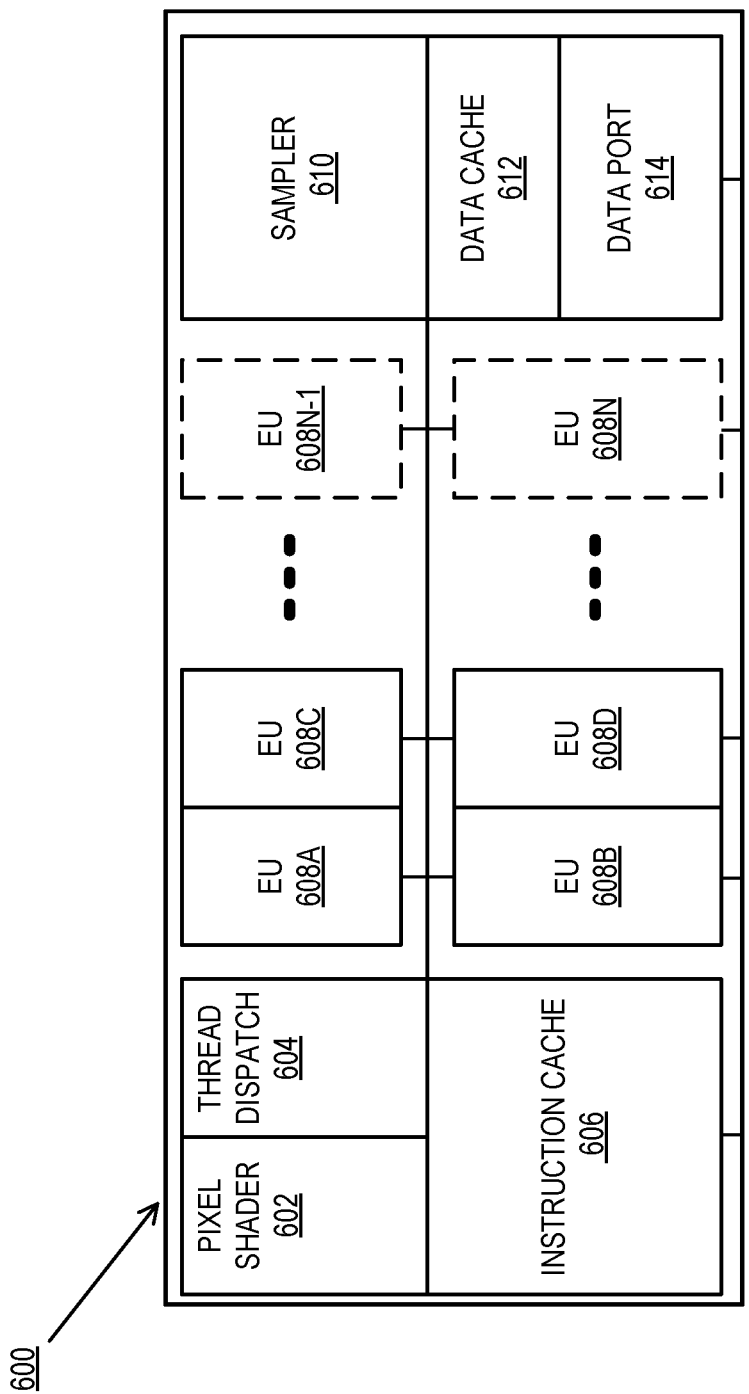
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
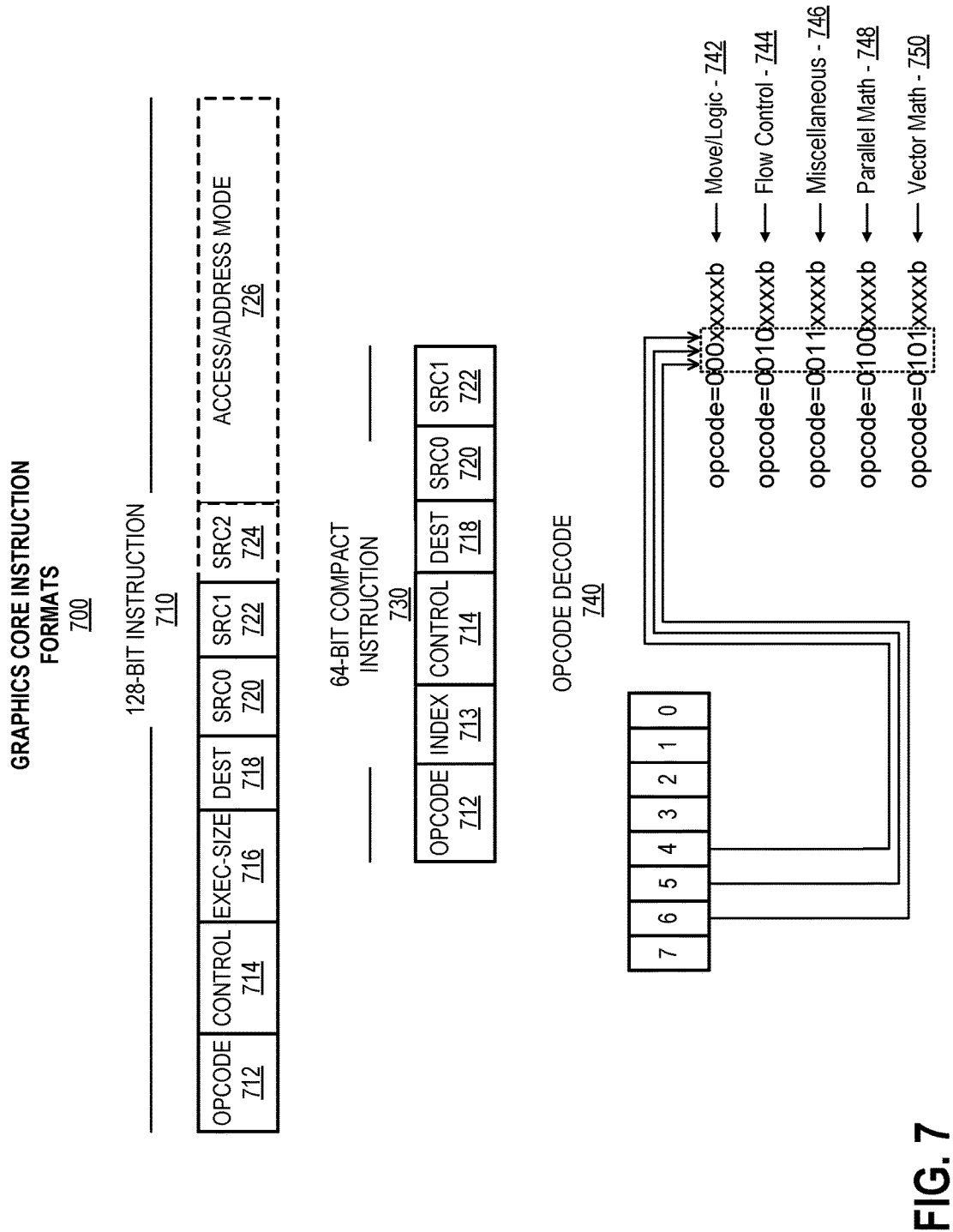
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
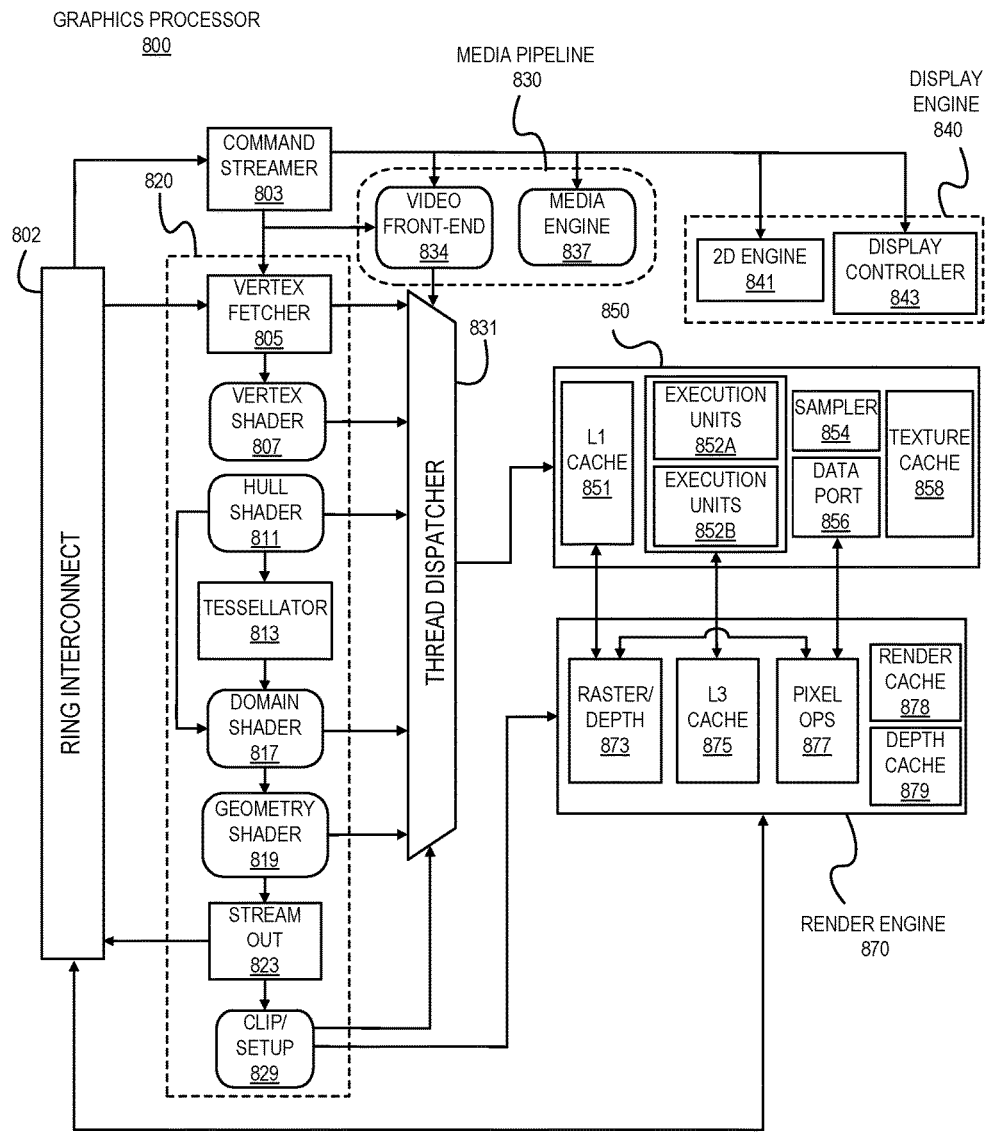
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
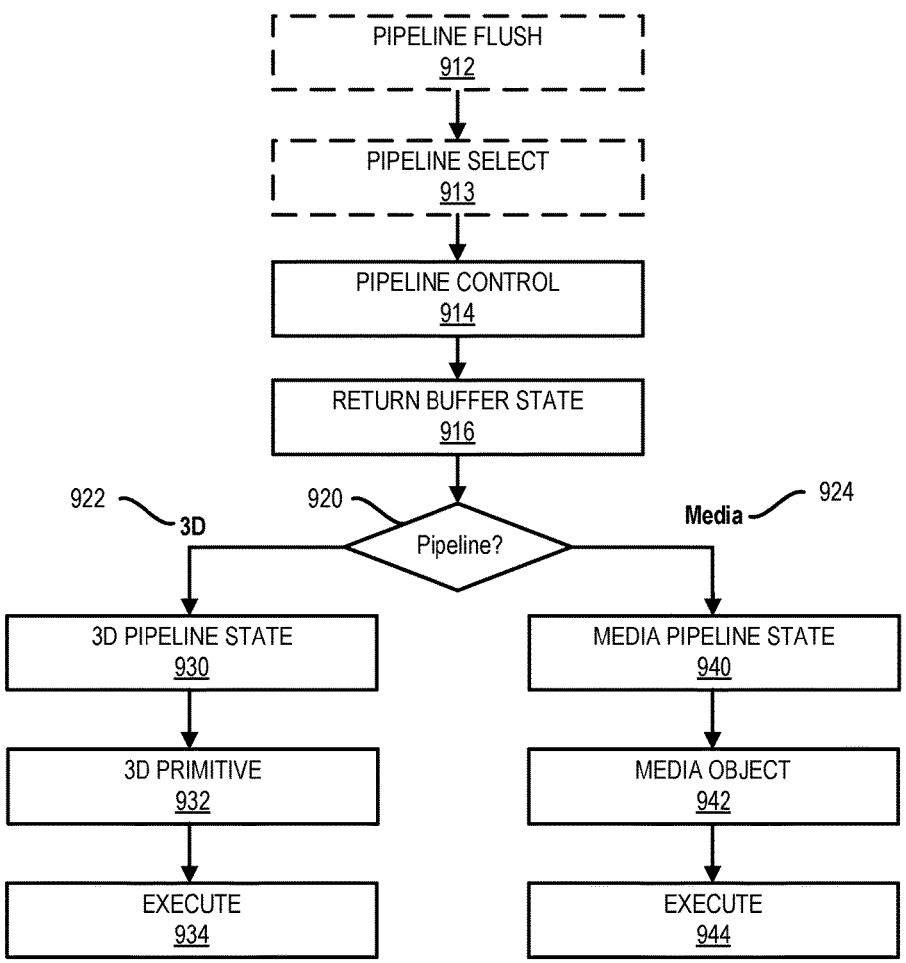
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
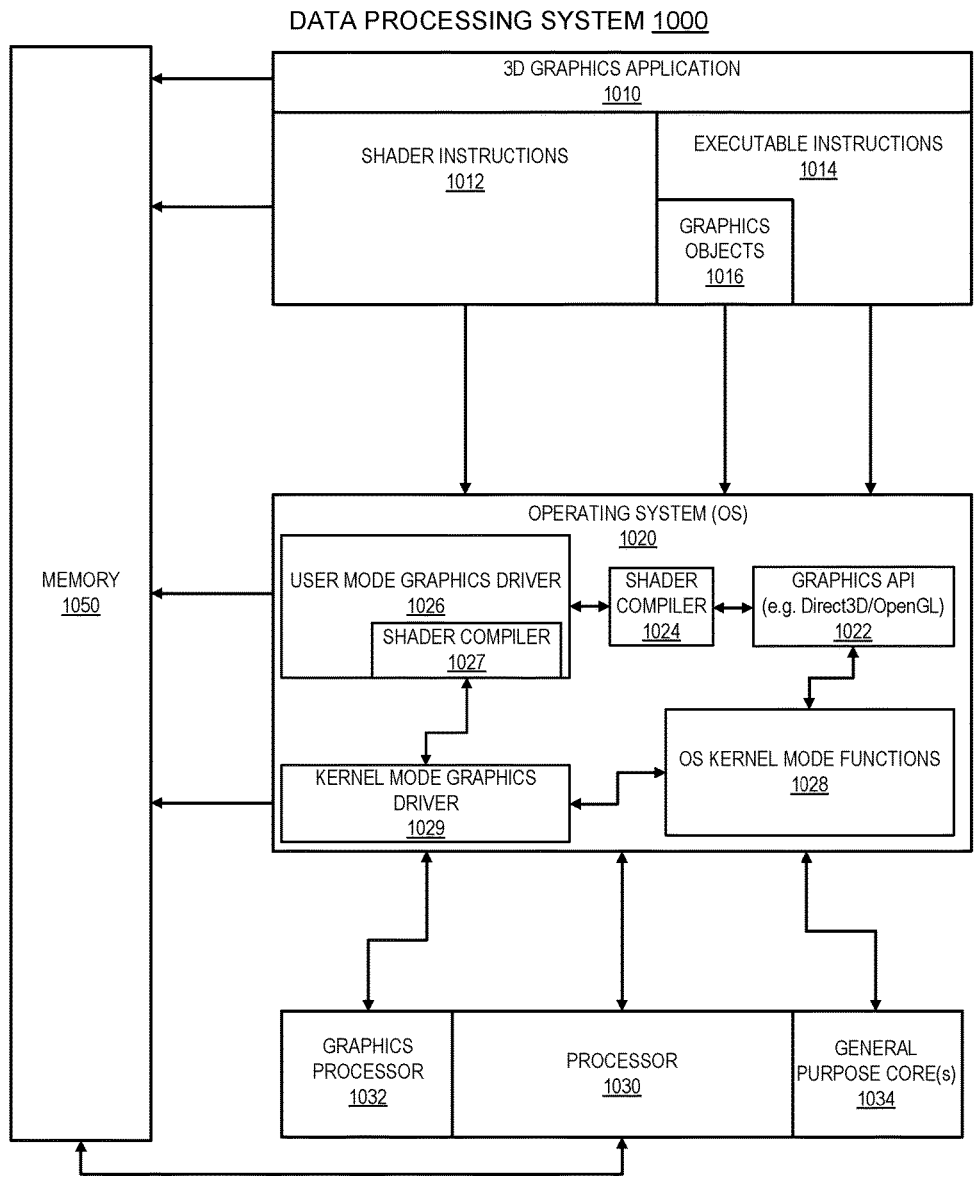
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
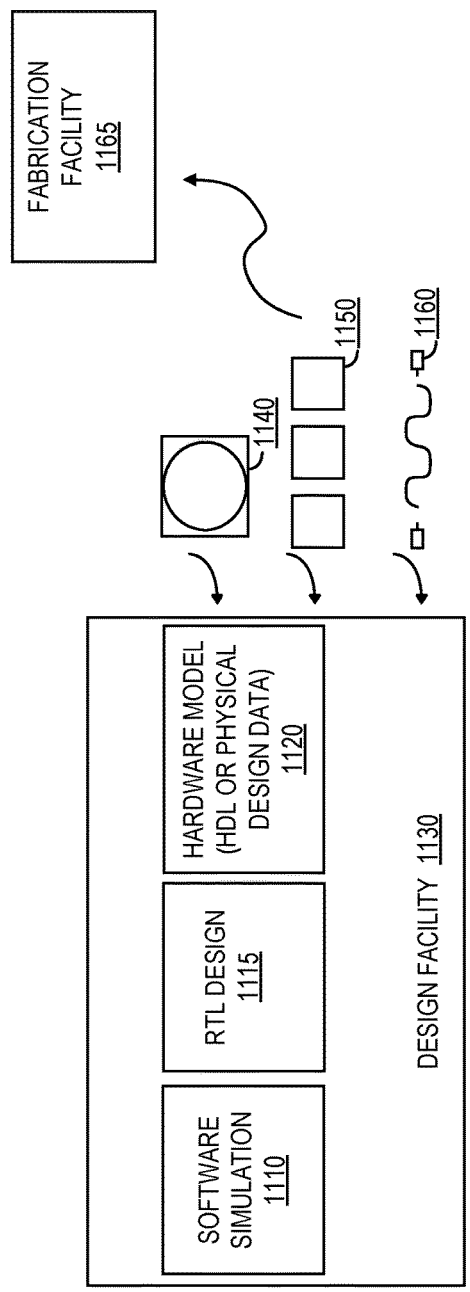
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
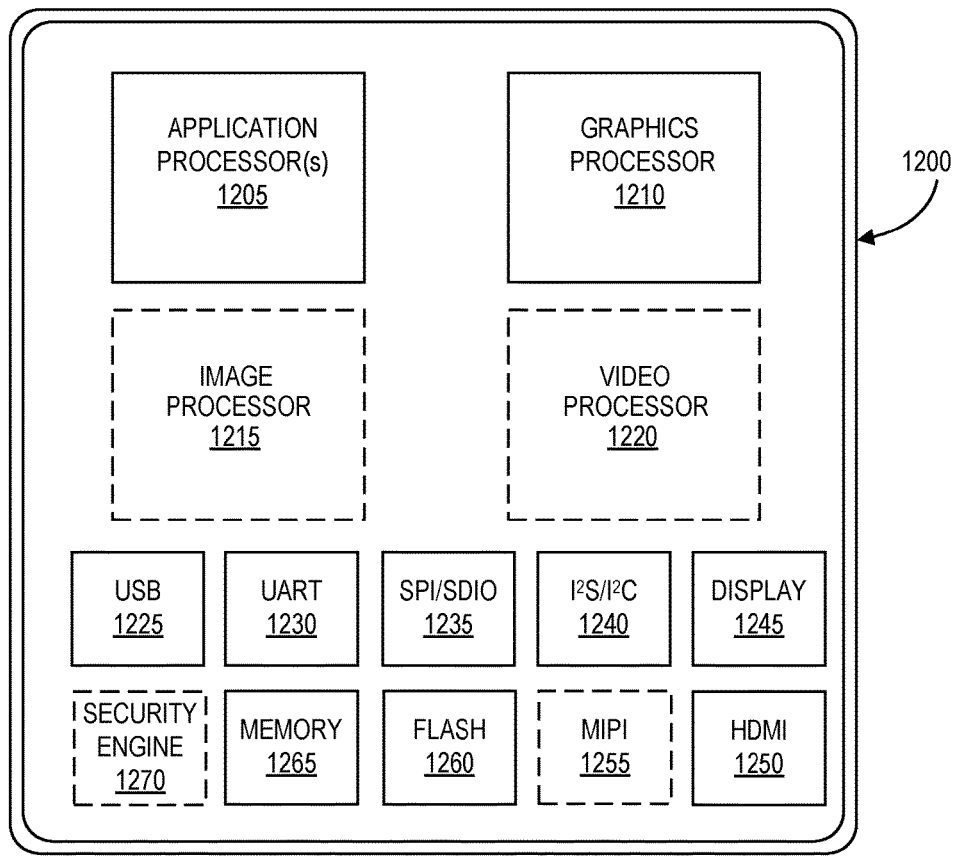
FIG. 12 illustrates an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Method and Apparatus for Identifying the Respectively Next Ray Surface Intersection within a Ray Tracing Architecture 1. Introduction In its most general form, ray tracing refers to a set of algorithms or kernels that allows different sorts of applications to determine which—or any—geometric primitive(s) will lie along the "line of sight" of a given "ray" R, where the ray R is typically specified as a directed line $R(t)=R_{org}+ tR_{dir}$, and the search for primitives is typically restricted to some (possibly open-ended) parameter interval t in [t0,t1].

The most common application of ray tracing is rendering, where rays are traced to transport light or particles between virtual camera, lights, and surfaces; however, ray tracing goes far beyond graphics, and is also often used in simulation codes related to ballistics, radio/wireless signals, sound propagation, physics, etc.

1.1 Find-First-Hit, Find-any-Hit, and Find-all-Hits

Over the years, many different kernels, data structures, and implementations for efficient ray tracing have been proposed. Most of these can be grouped into two kinds of families: find-first-hit kernels for finding the closest hit along a ray (i.e., the hit H with smallest $H_t \in [t_0,t_1]$), and kernels for determining if there is any intersection (find-any-hit) in the specified ray interval. The first of those kernels allows an application to determine which surface a given ray/particle/wave will next interact with; the second one is commonly used to determine whether there is an unoccluded line of sight between two points (e.g., for determining shadowing or occlusion between a source and a receiver).

While those two are by far the most commonly used kernels, there is one other type of kernel, namely to find either all hits (find-all-hits) or the first N hits (find-N-hits). These so-called multi-hit kernels have generally received significantly less attention than closest-hit and any-hit—arguably because in rendering they can often (but not always) be emulated by simply "stepping through" multiple hits with repeated calls to find-closest.

1.2 why Multi-Hit is Important

While first-hit and any-hit are often sufficient for rendering—where ray-surface interactions typically trigger new, different, rays to be traced off that hit point—multi-hit kernels are particularly useful for workloads where the simulation often has to consider multiple ray-surface interactions along the same ray—such as, for example, when a particle, wave, or projectile penetrates through often multiple layers of geometries before it gets absorbed or scattered by the medium between two surfaces.

For such applications, multi-hit kernels are important for either one of two key reasons. The first such reason is efficiency. For kernels that do need to operate on multiple (or all) successive intersections along the same ray, finding all those N intersections in a single traversal can be significantly more efficient than performing N successive, independent traversals. If done individually, successive rays will often re-traverse nodes and re-intersect primitives that the previous ray already processed.

The second reason—robustness and correctness in the presence of coplanar or nearly coplanar surfaces—is arguably even more important. When using first-hit kernels to step through multiple successive hits, one of two things can generally happen. If hits at exactly the same distance t as the previous hit point's t are allowed, algorithms may get stuck in "self-intersections" or cycling through the same set of equal-distance hits ad infinitum. To avoid this case, the commonly used method is to disallow equal-distance hits, often through "epsilon-offsetting" (i.e., moving the valid ray interval's entry point ahead by a small epsilon). This does indeed avoid self-intersections, but means that out of multiple hit points at the same or very close distances, only one will ever be found, as all others will be rejected by the epsilon-offset ray interval.

For simple rendering algorithms, finding only one of multiple co-planar surfaces is often acceptable; but is not acceptable for high-quality rendering algorithms or simulation codes for which surfaces are used to model the boundaries of solids or media between these boundaries. Most such algorithms internally need to track where exactly the ray enters and leaves different objects, so it important to properly find both the surface where the ray leaves one object and the surface where the ray enters the other object, even if those two surfaces are co-planar (which, in these workloads, is the common case, not an outlier). For such workloads, using a find-all-hit kernel is generally the only way to guarantee that each and every ray-surface intersection will be reported exactly once—without either missing or double-reporting any. This is true even if the algorithm will eventually need only the first few of these intersections.

In Rendering algorithms, this case is important in particular when dealing with participating media, large amounts of partly transparent surfaces, etc, in which find-all-hits kernels are used.

1.3 Why Multi-Hit is not Enough

Find-all-hits kernels effectively solve the correctness problem, and are also quite efficient for applications that require all hit points. However, they have limitations. First, it is generally not possible to predict how many hit points a given ray will eventually yield, making effective memory management for a find-all-hit kernel's return value challenging. This is particularly true in the context of otherwise fast ray tracers and/or modern high-throughput platforms on which many rays are in flight in parallel, and where potentially unbounded memory per thread is a challenge.

Second, even the efficiency argument is more complex than it sounds. Finding all hits in one sweep will clearly be more efficient for cases where the application does indeed require all such hit points; but in most applications the particle/wave/projectile will eventually get absorbed or deflected, so all hit points beyond that point will have been computed unnecessarily. As such, whether a find-all-hits kernel that finds all N hits is indeed faster than tracing M individual rays for the M<N hit points that the application really needs will depend on the respective values of M and N, neither of which can be predicted or even bounded beforehand.

Replacing the find-all-hits kernel with a special find-K-hits kernel that always finds only the first K hits, for a given fixed K, can both solve the unbounded memory problem and alleviate the find-all-hits overhead for M<<N. However, this implementation would still suffer from significant overhead if K is significantly larger than the unknown number of M required hits; and re-opens the robustness questions for those cases where the chosen K turns out to have been too small.

Eventually, all of the issues discussed above—epsilon offsetting for find-first hits, skipping of intersections when using epsilon offsetting, memory and compute costs to find-all-hits, and dealing with find-K-hits kernels—would largely go away as soon as there was an efficient way of iteratively stepping through multiple hits along the same ray in a robust and correct way, and ideally without having to re-start traversal for every next step.

1.4 Contributions

Embodiments of the invention include a modification to existing find-first-hit kernels that essentially solves the robustness problem by guaranteeing that multiple successive calls will return each surface exactly once, in a front-to-back manner, without skipping or multiply reporting any hit points. In addition, some embodiments include an iterative find-next hit kernel that allows for stepping through multiple hits more efficiently than using multiple sequential but independent rays.

2. Find First Hit

As mentioned above, there are two main reasons for looking at multi-hit kernels: efficiency when requiring multiple hit-points at once, and correctness (as in not skipping any hit points) when iteratively querying the respectively "next" hit point along a ray. Ignoring the issue of efficiency for the moment, one embodiment of the invention includes a modification to existing ray traversal schemes that makes them robust with respect to hit points at the same distance.

2.1 Identifying the Problem

To choose the proper fix, the root cause of the problem needs to be addressed: successive calls to a regular find-first-hit kernel leads to incorrect results because hit points with same distance get skipped; this happens because the application has to do epsilon-offsetting of the valid ray interval (i.e., explicitly asking for a minimum hit distance behind the last hit). Epsilon-offsetting only has to be done to avoid self-intersections, and those in turn only happen because tracking the respectively "closest" hit during traversal cannot distinguish between hits of the same distance.

Looking at it this way, the root of the problem is the simple fact that comparing different hits only by distance is ambiguous, allowing the traversal algorithm a way to determine which hits are closer than others, but not allowing it to put a clear, non-ambiguous order on hits that have the same distance. As long as no such non-ambiguous order exists, talking about the respective "first" or "next" hit along a ray does not make sense.

3.2 Fixing the Problem

Figure 13:
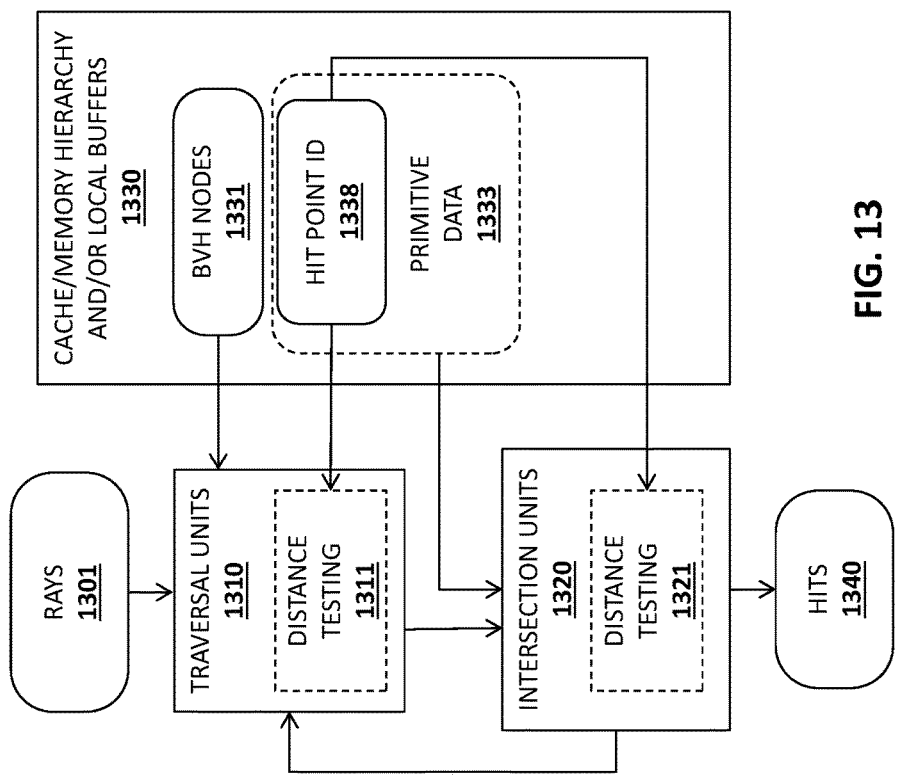
FIG. 13 illustrates one embodiment of a system for performing distance testing in a ray tracing architecture.

One embodiment of the invention modifies the "distance test" used in ray traversal and primitive intersection to become disambiguated. Specifically, as illustrated in FIG. 13, rather than testing only the actual distance to the surface (which necessarily becomes ambiguous when multiple surfaces share the same distance), an absolute order of all ray-surface intersections is defined by taking a tuple of distance and some unique hit point ID 1338 such as the primitive ID (which may be stored in memory 1330 with other primitive data 1333). Distance testing logic 1311, 1321 within the traversal unit 1310 and/or intersection unit 1320, respectively, may use the hit point ID 1338 to disambiguate hit points on surfaces which share the same distances. Thus, using the hit point ID 1338, an order is defined such that one surface intersection is "less than" (i.e., is reported before) another if its distance to the ray origin is smaller, OR, in the case of equal distances, if its unique hit point ID 1338 is less than the other hit point ID. In one embodiment, whenever tracing a ray to find the "next" intersection, the existing distance/hit point ID tuple is stored with the ray (e.g., within a cache/memory hierarchy and/or local buffers 1330), and the intersection with the "smallest" tuple determined (using that absolute order) that is still greater than the preceding one.

Other components in FIG. 13 may operate in a known manner. For example, the traversal unit 1310 traverses rays 1301 received from a ray generation unit (not shown) through a ray traversal accelerations structure such as a bounding volume hierarchy (BVH) as defined by a set of BVH nodes 1331. The same technique also works for other acceleration structures such as kd-trees, grids, etc. Nodes which are determined to include primitives are passed to the intersection units 1320 which identify intersections between the rays and primitives.

In a ray tracing system, there is a feedback-loop between the intersection unit 1320 and traversal unit 1310 because intersection happens during traversal (i.e., every time a ray traverses a leaf node). In that case, the ray is intersected with the primitives in the nodes one or more ray-primitive intersections are identified (and the closest one typically stored), but since traversal may not be completed, there may be other, closer intersections in other nodes. Thus, one of two things may occur: If an intersection is found AND it can be guaranteed to be closer than any other we might still find (e.g., because it is closer than any other nodes still on the traversal stack), then it may be output as "the" intersection; if not, it is stored and traversing continues. Either way, a ray will typically not be passed to a shader until the entire traversal/intersection process is completed. Once completed, the shader computes a color which is written to the accumulated image. Additionally, the shader may generate shadow or secondary rays which may be passed back to the traversal stage.

Returning now to the distance testing logic 1311, 1321 implemented within the traversal and/or intersection units, a total order on hit points may be enforced using a comparison operator $<_{hit}$ that implements a total order relationship on the space of all possible hit points. For example, assuming that each possible hit point H could be uniquely identified through a primitive ID H.p and a distance H.t, then both distance and primitive ID may be used in the comparison and, in particular, the primitive ID may be used to disambiguate hits with same distance. Stated mathematically:

$$H_1 < H_2 = \begin{cases} \text{true}; & \text{for } H_1 \cdot t < H_2 \cdot t \\ \text{true}; & \text{for } H_1 \cdot t = H_2 \cdot t \text{ and } H_1 \cdot p < H_2 \cdot p \\ \text{false}; & \text{otherwise} \end{cases}$$

Using such a total order, the order of hit points along a given ray is now well defined, meaning it is now possible to query exactly the next hit point which is the one that is $<_{hit}$ any other hit points, but that comes "after" another hit $h_0$. Similarly, the concept of a "valid t interval" $t \in [t_0, t_1]$ can be replaced by a "valid hit interval" $h \in [H_0, H_1]$ that only allows for hits H that fulfill $H_0 < H < H_1$. For applications that only want to specify a minimum distance $t_0$ even if there is no intersection at that distance it is still possible to specify a minimum hit $H_0 = (t_0, -1)$ (assuming that $-1$ is an invalid primitive ID).

Figure 14:
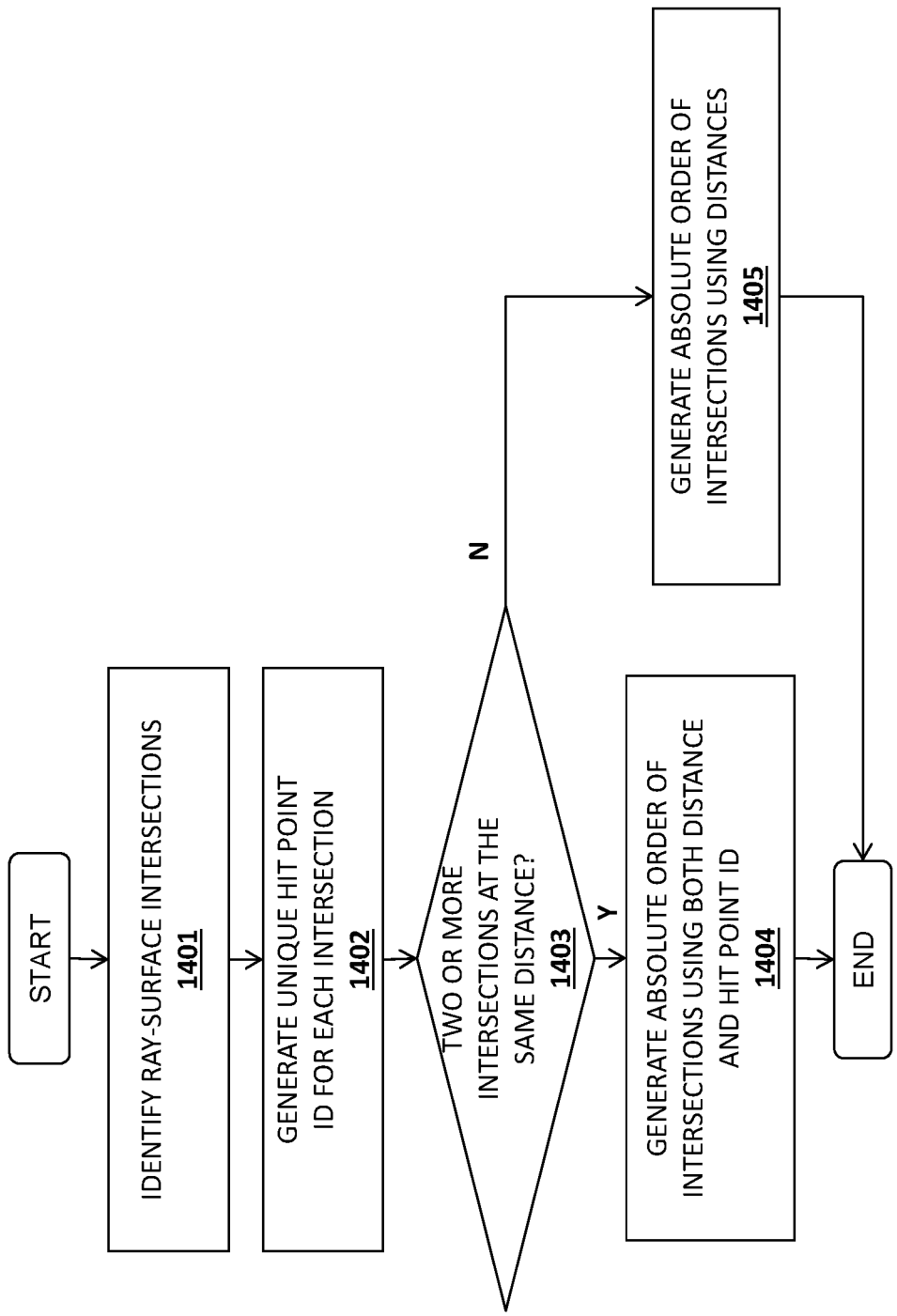
FIG. 14 illustrates a method in accordance with one embodiment of the invention.

Once this modified comparison test is integrated into a given find-first-hit traversal kernel (e.g., within distance testing logic 1311), an application that needs to step through multiple hits along a ray can easily do this knowing that each hit will be reported exactly once. Given an initial ray interval $[t_0; t_1]$, the application starts by querying the first hit in the $[(t_0; t_1); (t_1; t_1-1)]$ interval and gets hit point; in the next iteration it would query the first hit in and get $\hat{H}_0$ A method in $[\hat{H}_0, (t_1, -1)]$ with one $\hat{H}_2$; etc. nent of the invention is illustrated in FIG. 14. The method may be implemented within the context of the ray tracing architectures described herein, but is not limited to any particular graphics architecture.

At 1401 two or more ray-surface intersections are identified and, at 1402, unique hit point identifiers (IDs) (e.g., primitive IDs) are generated for each intersection point. If two or more of the intersections have the same distance (or nearly the same distance, making them impossible to differentiate), determined at 1403, then at 1404 an absolute order of intersections in generated using a combination of distance and hit point ID. A primitive ID, for example, which uniquely identifies the primitive being intersected, may easily be used to differentiate between intersections that share the same distance. If the two or more intersections are not at the same distance then, at 1405, an absolute order of intersections is generated using the respective distances.

3.3 Variations and Extensions

While the above description uses a single primitive ID, extension to multi-level addressing schemes (such as Embree's (instID, meshID, primID)) is straightforward. Any other comparison method may be used as long as any pair of hit points has a consistent and well defined order. In particular, since all that needs to be modified in one embodiment is the distance test between two hit points the method is completely compatible with any acceleration structure, primitive type, traversal order, SIMD optimization, or other traversal variant that is based on tracking the "closest" hit inside of a given interval.

It is, in fact, possible to engineer the ordering relation to achieve other goals that may be desirable for the application. For example, for applications that need to track which objects a ray enters or leaves the find-next-hit kernel may be configured to always return "leave" events before "enter" events. Similarly in rendering, when dealing with decals, surfaces tagged as decals may be ensured to be returned before the base geometry.

In terms of cost, the modifications are trivially cheap. Regardless of the traversal method, the traversal unit will already be performing distance tests, so all that has to be done is the additional $H_0.t = H_1.t \&\& H_0.p < H_1.p$ test in case the existing distance test failed.

4. Efficient Find Next Hit Algorithm

While the embodiments described above address an important limitation for a multi-hit kernel (i.e., the problem of missing intersections), these embodiments still require a complete re-start of the data structure traversal every time the traversal is being called. One embodiment comprises a kernel that can "pick up" where a previous call has left off. To do this, a technique is needed for passing information from a traversal to the respectively "next" hit in the same traversal sequence. For this, a break is made with the paradigm that all traversals are independent, in favor of a new two-step paradigm that is similar to an "iterator." After requesting a new "find next hit" iterator for a given ray, subsequent calls to that iterator will successively return the respective next hit point. The iterator can then track information about what has already been traversed.

With the iterator paradigm in place, implementing an efficient find-next-hit architecture is relatively straightforward. First, nodes are tracked that have not yet been traversed and nodes are only traversed when the next hit has been found. This means that the iterator has to use a stack or priority queue of as-yet-untraversed nodes. In one embodiment, these are traversed until the currently closest hit is guaranteed to be closer than any untraversed node. Second, every hit encountered during traversal is tracked. Even a hit that is not the currently closest hit may be the closest hit in a future traversal; as such, the iterator also needs to keep track of all hits already found (probably in some form of heap or sorted list).

Though the core ideas describe herein are also applicable to other data structures, the remainder of this description will focus on bounding volume hierarchies (BVHs) (of arbitrary branching factors) because BVHs are by now the most prevalent acceleration structures. Also, though the same techniques can also be implemented in recursive depth-first traversal schemes it is most easily explained in a front-to-back BVH traversal.

4.1. Front-to-Back Traversal for BVHs

Unlike spatial hierarchies such as grid or KD-trees, Bounding Volume Hierarchies (BVHs) are object hierarchies in which different subtrees can overlap. This means that recursive BVH traversal cannot guarantee that nodes (or leaves) will be traversed in a front to back order even if each traversal step properly sorts its children.

Though front-to-back traversal is sometimes believed to be impossible with BVHs, it is in fact easy to achieve. All that needs to be done is to replace the stack of still-to-be-traversed nodes with a priority queue (e.g., a heap, sorted list, etc), and insert still-to-be-traversed nodes by their distance to the ray origin (which is known from the ray-box intersection test). A pseudo-code version of this algorithm is provided in Table 1 below.

TABLE 1

| | Pseudo Code: Front-to-back Traversal for BVHs. |
|---|---|
| 1 | /* initialize a new next-hit traversal sequence */ |
| 2 | void findFirstHit_frontToBack(Ray ray) |
| 3 | { |
| 4 | /* traversal state: queue of as-yet-untraversed nodes, |
| 5 | and closest as-yet-found hitpoint */ |
| 6 | priority_queue<float,Node> nodeQueue; |
| 7 | Hit closestHitSoFar; |
| 8 | |
| 9 | /*! initialize traversal: */ |
| 10 | nodeQueue = { scene.rootNode( ) }; |
| 11 | closestHitSoFar = { <NO_HIT> at t=infinity }; |
| 12 | |
| 13 | /* iteratively traverse the respective closest node */ |
| 14 | while (nodeQueue not empty) { |
| 15 | /* get closest node */ |
| 16 | Node closestNode = nodeQueue.pop_front( ); |
| 17 | /* early exit: if node is further than closest |
| 18 | known hit then ALL other hits must be even further */ |

TABLE 1-continued

| | Pseudo Code: Front-to-back Traversal for BVHs. |
|---|---|
| 19 | if (closestNode.t >= closestHitSoFar.t) |
| 20 | return closestHitSoFar; |
| 21 | /* otherwise: 'expand' closest node */ |
| 22 | if (node is leaf) { |
| 23 | foreach prim in node { |
| 24 | if ((hit = intersect (ray,prim)) != <NO_HIT>) |
| 25 | /* found valid intersection: accept (only) |
| 26 | if closer than current hit */ |
| 27 | if (hit.t < closestHitSoFar.t) |
| 28 | closestHitSoFar = hit; |
| 29 | } |
| 30 | } else { |
| 31 | foreach child of node /* possibly in SIMD */ { |
| 32 | /* enqueue every child that intersects |
| 33 | the ray, with its respective distance */ |
| 34 | if (child.box intersects ray) |
| 35 | nodeQueue.insert(child,distanceTo(child)); |
| 36 | } |
| 37 | } |
| 38 | } |
| 39 | /* no more nodes to expand... return closest hit |
| 40 | we found so far (could be '<NO_HIT>') */ |
| 41 | return closestHitSoFar; |
| 42 | } |

This pseudo code does not actually optimize for the findNextHit case, but enforces a front-to-back traversal of BVHs that, in one embodiment, forms the basis for the findNextHit operations.

A method for front-to-back traversal is illustrated in FIG. 15. The method may be implemented on the architectures described herein but is not limited to any particular graphics processing architecture.

At 1501, untraversed BVH nodes are queued along with the closest currently located hitpoint. At 1502, the closest untraversed node is identified and, at 1503, if the node is further than the closest known hit, then all other hits must be further as indicated at 1510. As such, the process terminates.

If the node is not further than the closest known hit, then at 1504, the closest node is expanded. At 1505, if the closest node is leaf node, then the primitives in this leaf node are tested for intersection, and for each successful intersection test, the resulting hit point is accepted only if it is closer than the current hitpoint. At 1506, if the node is not a leaf node, then every child of the node that intersects with the ray is enqueued, along with their respective distances. If the queue is empty, determined at 1507, then the process terminates. If not, then the process returns to 1502 for the closest enqueued node.

4.2. Adaptation to findNextHit

Once a front-to-back traversal is attained, implementing a find-next-hit scheme is rather simple. In one embodiment, in addition to a priority queue for the as yet untraversed nodes, a priority queue of already found hits is maintained. Then, as soon as the closest already found hit is closer than the closest not yet traversed node, this is the guaranteed to be the closest hit, and can be returned. Otherwise, the closest yet-untraversed node is popped from the priority queue, and traversed. If it is a leaf node, all primitives are intersected and all found hits are added to the hit list (each with their respective distance); if it is an inner node all children are tested and added to the node list. The next-hit sequence gets initialized with a node queue that contains the BVH root node.

A simple pseudo-code of this algorithm—including the corner cases of "no more nodes to traverse" is provided in Table 2 below. Subsequent calls are guaranteed to report each hit exactly once, in depth sorted order.

4.3. Discussion

One minor drawback to the above technique is that it cannot easily be mapped to existing ray tracing APIs without modifying the API. Embree, for example, offers a single rtcIntersect( ) call that does not offer any means of passing traversal state from one call to the other. As such, in one embodiment, three API calls are used to implement this scheme: One to start a new traversal (e.g., state=rtcInitTraversal(ray)), one to find the respective next hit (eg, rtcFindNextHit(state)), and one to end a traversal sequence and release state information (e.g., rtcEndTraversal(state)).

4.3.1. Performance Considerations

In terms of performance, the concept of passing an entire traversal state from one call to the next initially looks like an expensive operation. In practice, however, virtually all recursive traversal methods already apply a stack of sorts, and since this will typically not fit into registers it will already be stored in memory (e.g., stack memory). Storing this in heap memory is a difference only for the programmer, and as long as this state stays in cache, the next call will have the same access speed whether it is heap or on stack.

There is a non-trivial cost in maintaining sorted priority queues. This requires a very careful implementation to minimize dynamic memory allocations. Even then, maintaining a priority queue will always be more expensive than tracking only the respectively closest ray. So if all that is needed is the first hit along a ray a traditional findNextHit kernel can be expected to be faster. Similarly, for a large (and predetermined) N, N subsequent calls may be expected to be slower than one dedicated kernel that queries all N hits in a single sweep. The kernel may be used, however, where this N is not known, and be guaranteed to always get the respectively next hit point no matter how many calls are being made.

4.3.2. Applicability to Other Acceleration Structures

Though the above embodiments are described in the context of a front-to-back traversal, they may also be implemented in any recursive ray tracer as long as there is a fast way of determining the closest yet-to-traverse node and closest already found triangle. Similarly, these embodiments are completely oblivious to BVH branching factors, the algorithm used for constructing the BVH, or the shape of bounding primitives; they may could even be used in "hybrid" BVHs in which even inner nodes store primitives, or in non-BVH data structures such as kd-trees, recursive grids, etc. These embodiments can also be integrated with Embree's concept of "intersection filters" (easily guaranteeing that each primitive is filtered only once), and may be extended to return any next hit rather than always the closest next one (as described above).

For the queue of hit points, the distance test described above may be used to disambiguate hits with same distance, but, since each primitive gets added to the hit queue only exactly once correctness can be guaranteed even if distance alone is used for the comparison. In this case, the order in which hits with the same distance are returned cannot be guaranteed, but no hits will be skipped or multiply reported.

TABLE 2

Pseudo-Code for Iterative findNextHit Kernel

```
1    struct NextHitIterator {
2        priority_queue<float,Hit>  hitQueue;
3        priority_queue<float,Node> nodeQueue;
4    };
5
6    /* initialize a new next-hit traversal sequence */
7    NextHitIterator *initNextHit(Ray ray)  {
8        NextHitIterator *it = new NextHitIterator;
9        it->ray = ray;
10       /* add BVH root node as (only) yet-to-traverse node */
11       it->nodeQueue = { scene.rootNode( ) };
12       /* no hits found yet: */
13       it->hitQueue = { empty( ) };
14       return it;
15   }
16
17   /*! find next hit along the ray (if one exists) */
18   Hit findNextHit (NextHitIterator *it) {
19       while (it->nodeQueue not empty) {
20           /* pick closest un-traversed node/subtree */
21           Node closestNode = it->nodeQueue.front( );
22           /* check if any hits are closer than closest node */
23           if (it->hitQueue not empty AND
24               hitQueue.front( ).t < closestNode.t)
25               /* this hit is guaranteed to be the next hit:
26                   it's the closest known hit,
27                   and closer than any other subtree */
28               return hitQueue.pop_front( );
29           /* no closer hits: remove node from queue... */
30           nodeQueue.pop_front( );
31           /* ... and traverse it: */
32           if (node is leaf) {
33               foreach pritmitive in node /* in SIMD */ {
34                   if ((hit = intersect(primitive)) != <NO_HIT>)
35                       it->hitQueue.insert(hit.t,hit);
36               }
37           } else {
38               /* ... test every child of this node ... */
39               foreach child of node /* possibly in SIMD */ {
40                   /* enqueue every child that intersects the ray,
41                       with its respective distance */
42                   if (child.box intersects it->ray)
43                       it->nodeQueue.insert(child,distanceTo(child));
44               }
45           }
46       }
47       /* no more expandable nodes: return closest hit */
48       if (it->hitList is empty)
49           /* no more hits - we're done */
50           return <NO_HIT>;
51       /* return closest hit in hitlist */
52       return it->hitList.pop_front( );
53   }
54
55   /*! terminate next-hit traversal: just release state */
56   void endNextHits(NextHitIterator *state)
57   { delete state; }
```

The above code consists of two parts: Initializing a new iterative traversal (initNextHit), and stepping from the last found hit to the respectively next hit along that ray.

Rather than keeping two separate priority queues—one for hits and one for nodes—one embodiment keeps only a single one that stores both. In this case, the algorithm becomes a simple elegant tree expansion algorithm where each node "expands" into either a set of hits or a set of new nodes to be traversed. Very similar schemes can also be applied to KD-trees, octrees, or any other hierarchical data structures, and even to grids.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
   identifying two or more ray-surface intersections of a ray;
   generating a unique hit point identifier (ID) for each ray-surface intersection of the ray;
   generating an absolute order of the two or more ray-surface intersections using a combination of distances and hit point IDs, wherein when two of the ray-surface intersections of the ray share a same distance to the ray origin, based on the hit point IDs, a first ray-surface intersection is determined to be traversed prior to a second ray-surface intersection sharing the same distance with the first ray-surface intersection; and
   writing a color of the ray to an accumulated image using the absolute order of the ray-surface intersections.

2. The method as in claim 1 wherein the unique hit point ID comprises a primitive ID uniquely identifying a primitive of the surface.

3. The method as in claim 1 further comprising:
   performing a first traversal operation using the first ray-surface intersection; and
   passing information from the first traversal operation to a second traversal operation using the second ray-surface intersection having a sequential order directly following the first ray-surface intersection.

4. The method as in claim 3 further comprising:
   maintaining a stack or priority queue containing ray-surface intersections that have yet to be traversed; and
   after performing a traversal using one ray-surface intersection, identifying a next ray-surface intersection from the stack or priority queue for a next traversal operation.

5. The method as in claim 4 further comprising:
   performing traversals until a currently closest ray-surface intersection is guaranteed to be closer than any untraversed ray-surface intersection in the stack or priority queue.

6. The method as in claim 5 wherein the traversal operations comprise traversals using nodes of a bounding volume hierarchy (BVH).

7. The method as in claim 6 wherein the traversal operations comprise back-to-front traversals in which untraversed ray-surface intersections are ordered in a first priority queue based on their distance to the ray origin.

8. The method as in claim 7 further comprising:
   storing previously traversed ray-surface intersections within a second priority queue.

9. The method as in claim 8 further comprising:
   comparing a previously traversed ray-surface intersection from the second priority queue with one or more ray-surface intersections in the first priority queue, and if the traversed ray-surface intersection from the second priority queue is closer, then identifying the previously traversed ray-surface intersection as the closest ray-surface intersection.

10. A graphics processing apparatus comprising:
    a ray tracing traversal/intersection unit to identify two or more ray-surface intersections of a ray, each of the ray-surface intersections being assigned a unique hit point identifier (ID);
    a distance testing module to generate an absolute order of the two or more ray-surface intersections using a combination of distances and hit point IDs, wherein two of the ray-surface intersections share a same distance to the ray origin, based on the hit point IDs, a first ray-surface intersection is determined to be traversed prior to a second ray-surface intersection sharing the same distance with the first ray-surface intersection; and
    a render to write a color of the ray to an accumulated image using the absolute order of the ray-surface intersections.

11. The graphics processing apparatus as in claim 10 wherein the unique hit point ID comprises a primitive ID uniquely identifying a primitive of the surface.

12. The graphics processing apparatus as in claim 10 further comprising:
    the ray tracing traversal/intersection unit performing t first traversal operation using the first ray-surface intersection and passing information from the first traversal operation to a second traversal operation using the second ray-surface intersection having a sequential order directly following the first ray-surface intersection.

13. The graphics processing apparatus as in claim 12 further comprising:

a stack or priority queue containing ray-surface intersections that have yet to be traversed; and after performing a traversal using one ray-surface intersection, the distance testing module identifying a next ray-surface intersection from the stack or priority queue for a next traversal operation.

14. The graphics processing apparatus as in claim 13 further comprising:

the distance testing module performing traversals until a currently closest ray-surface intersection is guaranteed to be closer than any untraversed ray-surface intersection in the stack or priority queue.

15. The graphics processing apparatus as in claim 14 wherein the traversal operations comprise traversals using nodes of a bounding volume hierarchy (BVH).

16. The graphics processing apparatus as in claim 15 wherein the traversal operations comprise back-to-front traversals in which untraversed ray-surface intersections are ordered in a first priority queue based on their distance to the ray origin.

17. The graphics processing apparatus as in claim 16 further comprising:

a second priority queue to store previously traversed ray-surface intersections.

18. The graphics processing apparatus as in claim 17 further comprising:

the distance testing module to compare a previously traversed ray-surface intersection from the second priority queue with one or more ray-surface intersections in the first priority queue, and if the traversed ray-surface intersection from the second priority queue is closer, then identifying the previously traversed ray-surface intersection as the closest ray-surface intersection.

19. A system comprising:

a memory to store data and program code;

a central processing unit (CPU) comprising an instruction cache for caching a portion of the program code and a data cache for caching a portion of the data, the CPU further comprising execution logic to execute at least some of the program code and responsively process at least some of the data, at least a portion of the program code comprising graphics commands;

a graphics processing subsystem to process the graphics commands and responsively render a plurality of image frames, the graphics processing subsystem comprising:

a ray tracing traversal/intersection unit to identify two or more ray-surface intersections of a ray, each of the ray-surface intersections being assigned a unique hit point identifier (ID);

a distance testing module to generate an absolute order of the two or more ray-surface intersections using a combination of distances and hit point IDs, wherein when two of the ray-surface intersections share a same distance to the ray origin, based on the hit point IDs, a first ray-surface intersection is determined to be traversed prior to a second ray-surface intersection sharing the same distance with the first ray-surface intersection, and a render to write a color of the ray to an accumulated image using the absolute order of the ray-surface intersections.

20. The system as in claim 19 wherein the unique hit point ID comprises a primitive ID uniquely identifying a primitive of the surface.

21. The system as in claim 19 further comprising:

the ray tracing traversal/intersection unit performing a first traversal operation using the first ray-surface intersection and passing information from the first traversal operation to a second traversal operation using the second ray-surface intersection having a sequential order directly following the first ray-surface intersection.

22. The system as in claim 21 further comprising:

a stack or priority queue containing ray-surface intersections that have yet to be traversed; and after performing a traversal using one ray-surface intersection, the distance testing module identifying a next ray-surface intersection from the stack or priority queue for a next traversal operation.

* * * * *